(12) United States Patent
Rea et al.

(10) Patent No.: US 10,144,541 B2
(45) Date of Patent: Dec. 4, 2018

(54) BEVERAGE CAPSULE MACHINE FOR MAKING SINGLE USE BEVERAGE CAPSULES

(71) Applicant: I.M.A. INDUSTRIA MACCHINE AUTOMATICHE S.P.A., Ozzano Dell'Emilia (Bologna) (IT)

(72) Inventors: Dario Rea, Monterenzio (IT); Pierluigi Castellari, Castel San Pietro (IT)

(73) Assignee: GIMA, S.P.A., Zola Predosa (IT)

( * ) Notice: Subject to any disclaimer, the term of this patent is extended or adjusted under 35 U.S.C. 154(b) by 513 days.

(21) Appl. No.: 14/764,691

(22) PCT Filed: Feb. 24, 2014

(86) PCT No.: PCT/IB2014/059211
§ 371 (c)(1),
(2) Date: Jul. 30, 2015

(87) PCT Pub. No.: WO2014/136015
PCT Pub. Date: Sep. 12, 2004

(65) Prior Publication Data
US 2016/0009427 A1    Jan. 14, 2016

(30) Foreign Application Priority Data

Mar. 6, 2013 (IT) .............................. BO2013A0096
Aug. 9, 2013 (IT) .............................. BO2013A0462

(51) Int. Cl.
*B65B 7/28* (2006.01)
*B65B 35/18* (2006.01)
(Continued)

(52) U.S. Cl.
CPC .......... *B65B 7/2807* (2013.01); *B65B 7/2842* (2013.01); *B65B 29/02* (2013.01);
(Continued)

(58) Field of Classification Search
CPC ....... B65B 7/28; B65B 7/2807; B65B 7/2814; B65B 7/2842–7/2892; B65B 29/02;
(Continued)

(56) References Cited

U.S. PATENT DOCUMENTS 1,748,961 A * 3/1930 Risser .................. B67B 3/2033
53/304
1,929,339 A * 10/1933 Troyer .................. B21D 51/32
413/27
(Continued)

FOREIGN PATENT DOCUMENTS

| CN | 1756697 A | 4/2006 |
|----|-----------|--------|
| CN | 1842466 A | 10/2006 |

(Continued)

*Primary Examiner* — Stephen F. Gerrity
*Assistant Examiner* — Joshua G Kotis
(74) *Attorney, Agent, or Firm* — Pearne & Gordon LLP

(57) ABSTRACT

A machine for making single use capsules (1) for extract or infusion beverages includes: a transport element (8) for transporting rigid containers (2) and being closed in a loop around movement apparatus (9); a feeding station (11) for feeding the rigid containers (2) into respective pockets (10) of the transport element (8); a dosing station (12) for dosing the product into the rigid container (2); a closing station (13) for closing the rigid container (2) with a piece of sheet (7); an outfeed station (14). The closing station (13) includes a unit (500) for preparing and feeding single pieces of sealing sheet (7) correlated with the shape of the upper aperture (4) of the rigid container (2); transfer apparatus (17) by which individual pieces of sealing sheet (7) are withdrawn sequentially and continuously from the preparing and feeding unit (500) and by which the selfsame pieces (7) are transported and delivered to a sealing wheel (19) adapted to seal the piece of sealing sheet (7) to the rigid container (2).

17 Claims, 6 Drawing Sheets

(51) Int. Cl.
  *B65G 47/84* (2006.01)
  *B65B 29/02* (2006.01)
  *B65B 35/02* (2006.01)

(52) U.S. Cl.
  CPC ............ *B65B 29/022* (2017.08); *B65B 35/02* (2013.01); *B65B 35/18* (2013.01); *B65G 47/848* (2013.01)

(58) Field of Classification Search
  CPC ..... B65B 29/022; B65B 29/025; B65B 61/08; B65G 47/846–47/848; B29C 65/7879–65/7885; B29C 65/80; B67B 3/04; B67B 3/06; B26D 1/445; B26D 1/626
  USPC ................... 53/334–340, 282, 302–304, 308
  See application file for complete search history.

(56) References Cited

U.S. PATENT DOCUMENTS

| | | | | |
|---|---|---|---|---|
| 3,018,594 | A * | 1/1962 | Phillips | B65B 7/28 53/300 |
| 3,174,372 | A * | 3/1965 | Huck | B26D 1/0006 83/110 |
| 3,342,304 | A * | 9/1967 | Greulich | B65B 35/44 134/82 |
| 3,492,785 | A * | 2/1970 | Mancini | B65B 3/32 141/173 |
| 3,527,020 | A * | 9/1970 | Mancini | B65B 7/16 53/282 |
| 3,939,625 | A * | 2/1976 | Remele | B41F 17/24 53/131.3 |
| 3,965,656 | A * | 6/1976 | Gerben | B65B 3/32 53/282 |
| 4,065,909 | A * | 1/1978 | Mueller | B65B 7/168 53/129.1 |
| 4,219,986 | A * | 9/1980 | Osterhaus | B67B 3/062 53/314 |
| 4,719,739 | A | 1/1988 | Foldesi | |
| 4,816,110 | A * | 3/1989 | Foldesi | B65B 7/2807 156/379.8 |
| 5,054,260 | A * | 10/1991 | Herzog | B67B 3/00 53/307 |
| 5,125,208 | A * | 6/1992 | Tsukada | B21D 51/30 413/52 |
| 5,649,412 | A * | 7/1997 | Binacchi | B65B 9/023 426/77 |
| 5,946,886 | A | 9/1999 | Bealer | |
| 6,115,992 | A * | 9/2000 | Bankuty | B65B 7/2835 53/308 |
| 6,405,852 | B1 * | 6/2002 | Christ | B65B 43/52 198/474.1 |
| 6,684,604 | B2 * | 2/2004 | Luc | B65B 7/01 53/244 |
| 7,412,813 | B2 | 8/2008 | Heil et al. | |
| 7,531,198 | B2 | 5/2009 | Cortese | |
| 2005/0129809 | A1 | 6/2005 | Cortese | |
| 2006/0213151 | A1 | 9/2006 | Heil et al. | |
| 2006/0260274 | A1 | 11/2006 | Rea et al. | |
| 2007/0062164 | A1* | 3/2007 | Gamberini | B65G 47/525 53/502 |
| 2015/0096270 | A1* | 4/2015 | Wilcox | B29C 65/7867 53/485 |

FOREIGN PATENT DOCUMENTS

| | | | |
|---|---|---|---|
| DE | 10 2007 027 389 A1 | 12/2008 | |
| EP | 1529469 A1 | 5/2005 | |
| WO | WO 0123259 A1 * | 4/2001 | ........... B65B 7/2878 |
| WO | 2010/007633 A1 | 1/2010 | |

* cited by examiner

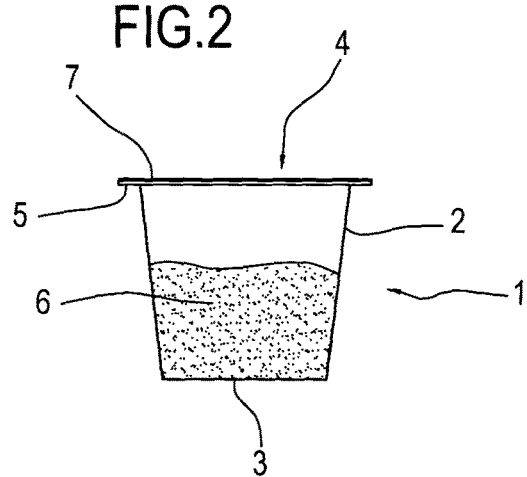
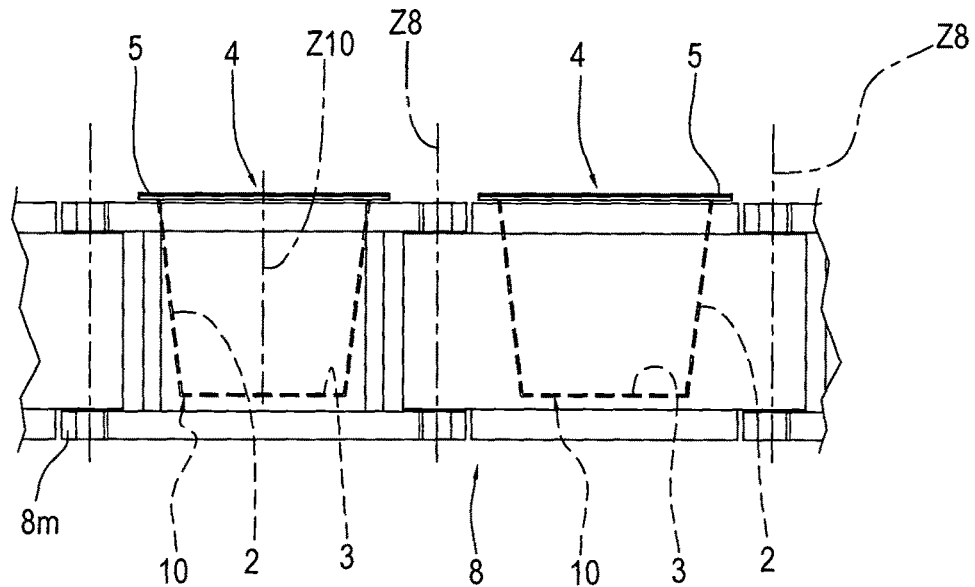
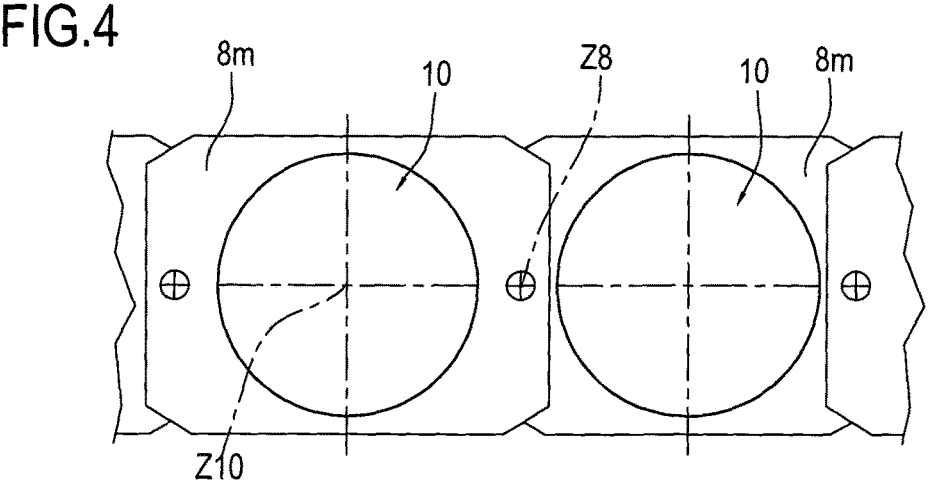

BEVERAGE CAPSULE MACHINE FOR MAKING SINGLE USE BEVERAGE CAPSULES

TECHNICAL FIELD

This invention has for an object a beverage capsule machine for making single use beverage capsules, in particular capsules for making extract or infusion beverages such as coffee, tea, milk, chocolate or combinations of these ingredients.

BACKGROUND ART

The above mentioned capsules, used in machines for making these beverages, comprise in their simplest form, the following:
- a rigid, cup-shaped container comprising a perforatable or perforated bottom and an upper aperture provided with a rim (and usually, but not necessarily, having the shape of a truncated cone);
- a dose of extract or infusion beverage product contained in the rigid container; and
- a piece of sheet obtained from a web for sealing the aperture of the rigid container and designed (usually but not necessarily) to be perforated by a nozzle which supplies liquid under pressure.

Preferably, but not necessarily, the sealing sheet is obtained from a web of flexible material.

In some cases, the capsules may comprise one or more rigid or flexible filtering elements. For example, a first filter (if present) may be located on the bottom of the rigid container. A second filter (if present) may be interposed between the piece of sealing sheet and the product dose.

The capsule made up in this way is received and used in specific slots in machines for making beverages.

At present, capsules of this kind are made using machines which operate in "step by step" fashion. One known example of machines of this kind is described in patent publication WO 2010/007633.

The machine described in document WO 2010/007633 comprises a conveyor belt which is closed in a loop around two power-driven horizontal-axis pulleys in such a way as to form an upper, active section and a lower, non-operative return section.

The belt comprises a series of successive pockets which receive the rigid containers fed by a corresponding station located above the active section of the belt.

As it moves stepwise along a feed direction, the active section of the belt positions each pocket with a respective rigid container in it under a series of stations for making up the capsule.

Basically, the station which feeds the rigid container is followed by at least one station for dosing the product into the rigid container, a station for closing the aperture of the rigid container with a piece of film (for example by heat-sealing) and, lastly, a station for feeding out the capsules thus made.

It should be noted, however, that along the rectilinear, active section of the belt, there may be further, auxiliary stations, such as, for example, stations to check capsule weight, to form the piece of film and to apply filters, or means for removing rejects, and so on.

However, a single production line combined with step by step operation has proved to be low in productivity per unit time.

To overcome this problem, the belt was made wider in the direction transversal to the direction of belt motion so as to form two or more juxtaposed rows of pockets for receiving respective rigid containers.

This technical choice, however, meant increasing the number of devices installed side by side in a horizontal plane transversely to the feed direction of the active section of the belt.

While this solution on the one hand partly increased the overall productivity of the machine per unit time, on the other it made the machine more cumbersome and decidedly more expensive and increased the risks of machine shutdowns owing to the large number of devices operating along the active section of the belt.

This structural choice does not therefore balance the overall costs with the results of operational productivity and does limit the operating speed of the machine.

DISCLOSURE OF THE INVENTION

The aim of this invention, therefore, is to provide a beverage capsule machine for making single use capsules for extract or infusion beverages such as coffee or tea and which overcomes the above mentioned disadvantages of the prior art.

More specifically, this invention has for an aim to provide a beverage capsule machine for making single use capsules for extract or infusion beverages such as coffee or tea and which is capable of guaranteeing high productivity per unit time, with high operating speeds and a reduced number of operating stations, and guaranteeing also a high level of dependability.

A further aim of the invention is to provide a beverage capsule machine for making single use capsules for extract or infusion beverages such as coffee or tea and which has a compact structure, is reduced in size and makes good quality products.

A further aim of the invention is to provide one or more operating stations capable of reaching high operating speeds, with production flexibility according to machine operating requirements, and with reduced dimensions along the operating path.

A further aim of the invention is to provide a station for closing the single-use capsules, capable of guaranteeing a good quality seal between the piece of sealing sheet and the aperture of the capsule, combined with a high production speed per unit time.

Another aim is to provide a capsule closing station capable of forming pieces of sealing sheet from a continuous web and of reducing the amount of sealing material used by reducing the amount of waste material.

These aims are fully achieved by the beverage capsule machine for making single use capsules for extract or infusion beverages according to the invention as characterized in the appended claims.

More specifically, the machine of the invention is used for making single use capsules for extract or infusion beverages such as coffee or tea, comprising a rigid, cup-shaped container having a bottom and an upper aperture provided with a rim, a dose of extract or infusion product contained inside the rigid container and a piece of sheet (or lid) for closing the upper aperture of the rigid container.

The machine comprises a transport element for transporting rigid containers and being closed in a loop around movement means for moving the transport element;

The transport element is configured to define a plurality of pockets for receiving the rigid containers and arranged in succession, each having a respective vertical axis. In light of this, the machine comprises a plurality of stations which are positioned along a path followed by the transport element and which are configured for operating in phase with the selfsame transport element and comprising a feeding station for feeding the rigid containers into the respective pockets of the transport element, a dosing station for dosing the product into the rigid container, a closing station where the upper aperture of the rigid container is closed with a piece of sheet, an outfeed station which withdraws the capsules formed from the transport element.

According to the invention, the closing station for closing the upper aperture of the rigid container comprises a unit for preparing and feeding single pieces of sealing sheet (or lids) correlated with the shape of the upper aperture of the rigid container.

Also according to the invention, the closing station comprises transfer means by which individual pieces of sealing sheet are withdrawn sequentially and continuously from the unit for preparing and feeding single pieces of sealing sheet (or lids) and delivered to a corresponding pickup element of a sealing wheel which is adapted to seal the piece of sealing sheet to the rigid container, is rotatable continuously about a first vertical axis along a rotational path and is equipped around its circumference with a plurality of pickup elements provided with corresponding sealing units.

Also according to the invention, the sealing units on the wheel are configured to be placed, in phase coordination, on top of a corresponding rigid container on the transport element 8 in such a way as to join the piece to the rigid container along a stretch of the path of the transport element comprising a stretch of the rotational path of the wheel in phase synchrony with the transport element itself.

In a first embodiment, the unit for preparing and feeding the piece of sealing sheet comprises a cutting unit by which single pieces of sealing sheet are continuously cut and separated from a continuous web. The cutting unit is configured to cut and separate single pieces of sealing sheet correlated with the shape of the upper aperture of the rigid container.

Thanks to this structure of the closing station, the sheets for sealing the aperture of the capsules are formed from a continuous web and transported into the sealing wheel quickly and precisely in a continuous cycle by which they are formed, fed and sealed.

In a variant embodiment, the unit for preparing and feeding the single sheets comprises a magazine for slidably housing a stack of single (ready made) sheets (lids) correlated with the shape of the upper aperture of the rigid container.

The unit for preparing and feeding the single sheets (cutting unit or magazine), combined with the transfer means and the sealing wheel, constitutes a station which is extremely compact in dimensions but very high performing in terms of quantity and quality.

BRIEF DESCRIPTION OF THE DRAWINGS

These and other features of the invention will become more apparent from the following detailed description of a preferred, non-limiting embodiment of it, with reference to the accompanying drawings, in which:

FIG. 2 is a schematic side view of a single use capsule, made with the machine of FIG. 1, for extract or infusion beverages such as coffee, tea, milk, chocolate or combinations of these ingredients;

FIGS. 3 and 4 are a schematic side view and a schematic top plan view illustrating a part of an element for transporting a rigid container.

DETAILED DESCRIPTION OF PREFERRED EMBODIMENTS OF THE INVENTION

Figure 1:
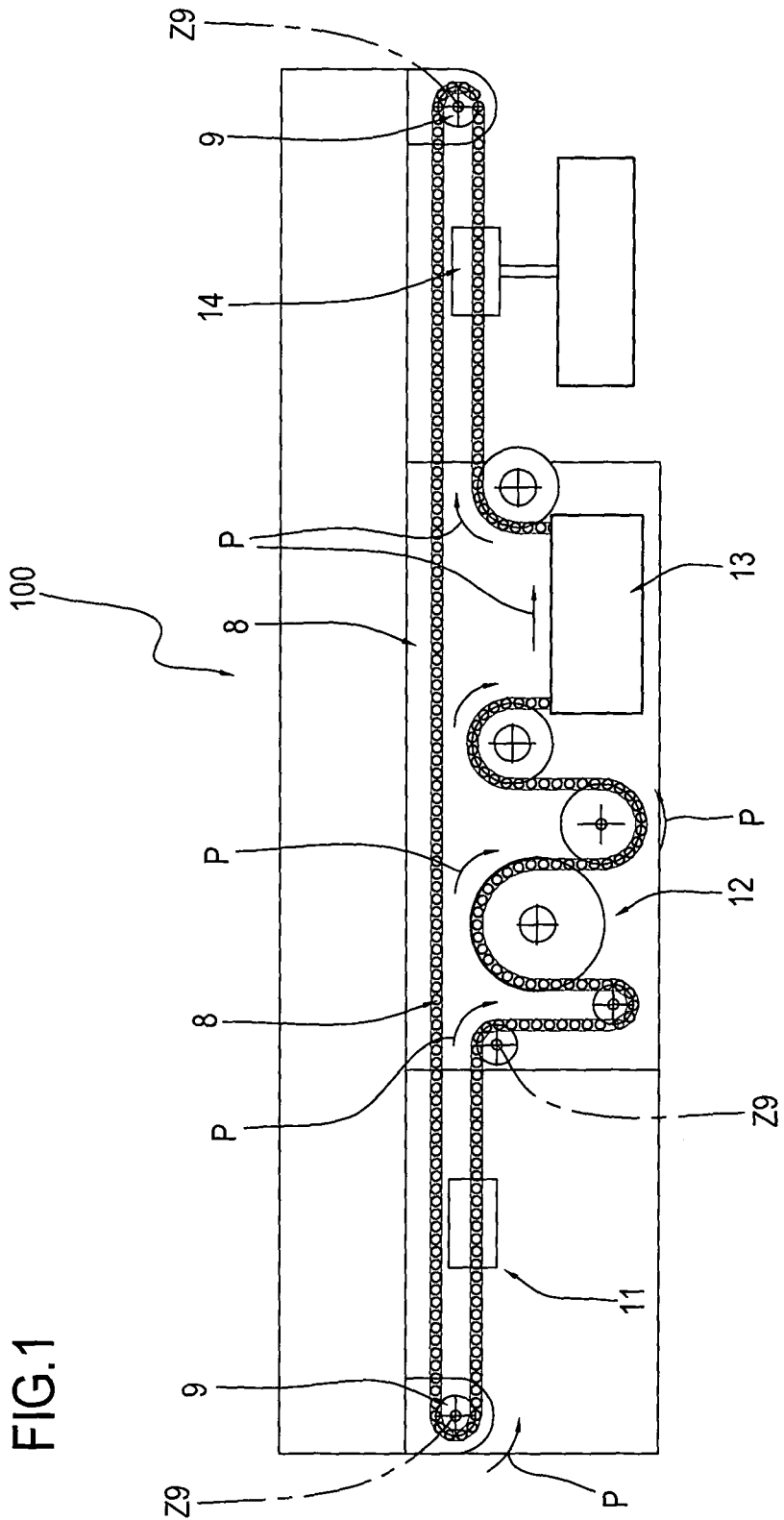
FIG. 1 is a schematic top plan view of a beverage capsule machine for making single use capsules for extract or infusion beverages such as coffee, tea, milk, chocolate or combinations of these ingredients.
Figure 5:
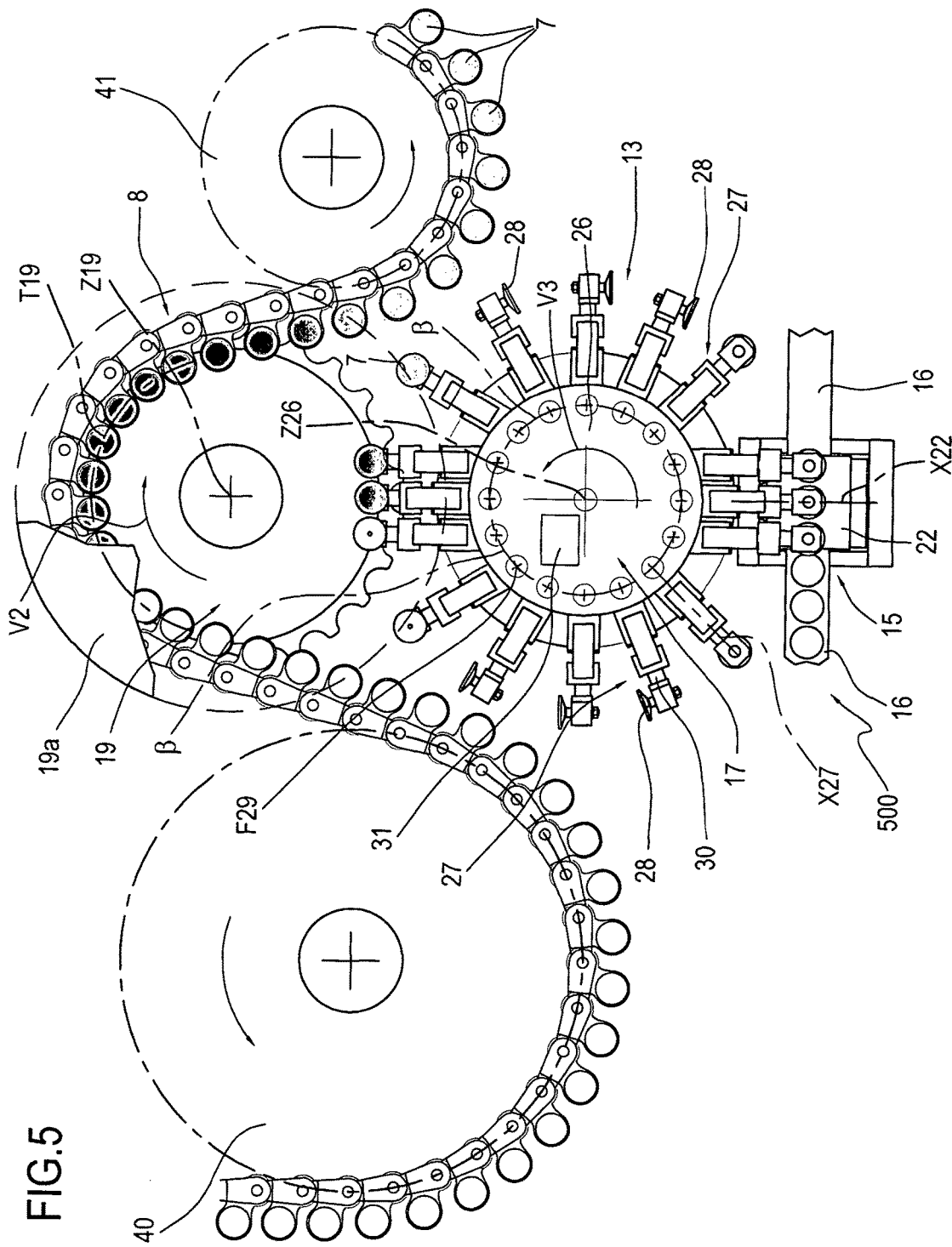
FIG. 5 is a schematic top plan view, with some parts cut away in order to better illustrate others, illustrating a closing station forming part of the machine of FIG. 1 in a first embodiment of it and by which the rigid container is closed with a sealing sheet (or lid)
Figure 6:
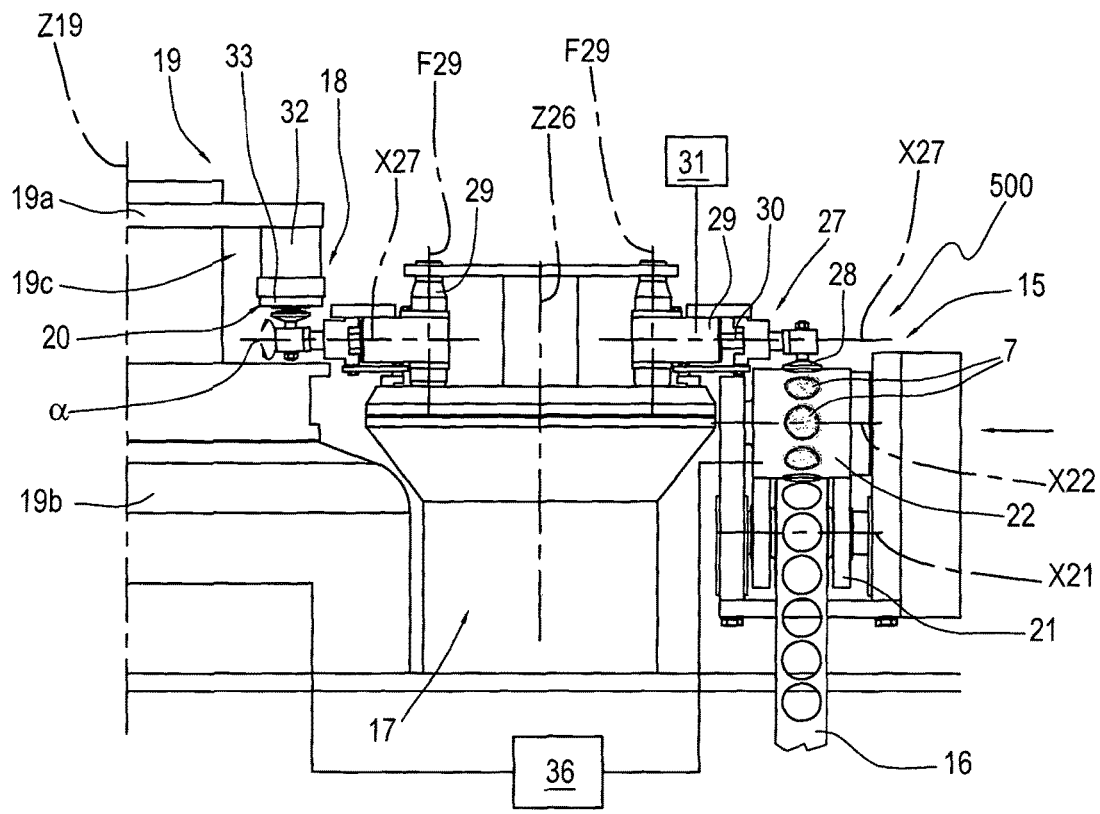
FIG. 6 is a schematic side view, with some parts cut away in order to better illustrate others, illustrating a part of the closing station of FIG. 5, equipped with a cutting unit for cutting pieces of sealing sheet.

With reference to the accompanying drawings, in particular FIGS. 1 and 2, the machine according to this invention (denoted in its entirety by the numeral 100) is used to make single use capsules for extract or infusion beverages such as coffee, tea, milk, chocolate or combinations of these ingredients.

More specifically—see FIG. 2 again—the single use beverage capsules 1 comprise, in a minimum, non-limiting configuration: a rigid, cup-shaped container 2 (usually in the shape of a truncated cone) comprising a bottom 3 and an upper aperture 4 provided with a rim 5; a dose 6 of product for extraction or infusion contained within the rigid container 2 and a piece of sheet 7 (or lid) for sealing the upper aperture 4 of the rigid container 2.

If the piece of sheet 7 is to be perforated when the beverage is made, the piece of sheet 7 forms a hermetic seal for the rigid container 2. It should be noted that the piece of sheet 7 is obtained from a flexible web, that is to say, a web of material having flexibility properties.

It should also be noted that this type of capsule 1 may also comprise one or more filtering elements (not illustrated here since they do not form part of the invention).

More specifically, a first filter may be located on the bottom of the rigid container in order to improve the distribution of the infusion product. The first filter may be a rigid filter. Alternatively, the first filter may be a flexible filter.

The capsule 1 may also comprise a second filter positioned between the piece of sheet 7 and the product dose: in this case, the second filter allows improved (uniform) distribution of the liquid on the product.

The machine 100 (again see FIG. 1) comprises a transport element 8 for transporting components of the capsule 1. The transport element 8 is closed in a loop around movement means 9 which rotate about axes Z9 for moving the transport element 8.

Preferably, but not necessarily, these movement means 9 rotate continuously about vertical axes Z9 to allow the transport element 8 to move continuously.

More specifically, the transport element 8 is configured to define a plurality of pockets 10 for receiving the rigid containers 2 and arranged one after the other in sequence, each having a respective vertical axis Z10 (see also FIGS. 3 and 4). The pockets 10 spaced from each other by a first spacing.

It should be noted that the machine 100 comprises a plurality of operating stations which are positioned along a feed path P followed by the transport element 8 and which are configured for operating in phase (also continuous) with the transport element 8 and comprising at least four basic stations.

A feeding station 11 feeds the rigid containers 2 into respective pockets 10 of the transport element 8.

A dosing station 12 doses the extract or infusion product into the rigid container 2.

A closing station 13 closes the open aperture 4 of the rigid container 2 with the piece of sheet 7 (or lid).

An outfeed station 14 withdraws from the transport element 8 the capsule 1 formed.

Preferably, the transport element 8 for transporting the rigid containers 2 is a chain comprising a plurality of links 8*m*, hinged to one another in succession about corresponding vertical axes Z8 to form an endless loop. It should be noted that at least one chain link 8*m* comprises at least one pocket 10, with a vertical axis Z10, for receiving a respective component (rigid container 2) positioned with the aperture 4 facing upward.

It should also be noted that the chain 8 may comprise a plurality of links 8*m*, even not in uninterrupted succession, comprising pockets 10, each with a vertical axis Z10, for receiving a respective component (rigid container 2).

In other words, the chain 8 may include links which are not provided with pockets 10 and which are interposed between links 8*m* which are provided with pockets 10 (this embodiment not being illustrated).

Preferably, each link 8*m* of the chain 8 comprises at least one pocket 10, with a vertical axis Z10, for receiving a respective component (rigid container 2) positioned with the aperture 4 facing upward.

It should be noted that the chain made in this way forms a single row of components (rigid containers 2) moving continuously along the predetermined feed path P.

Alternatively, in a preferred embodiment of the invention, not illustrated, the transport element 8 comprises a belt and a plurality of supporting elements which define the pockets 10 for the rigid containers 2. The supporting elements may be fixed to the belt by suitable fastening means, such as lock plates and screws. The belt may advantageously have at least one plurality of internal teeth adapted to mesh with the movement means 9, comprising, for example, a toothed pulley. Advantageously, the belt might also have a plurality of external teeth adapted to mesh with corresponding teeth of at least one toothed wheel present in at least one of the operating stations. This toothed wheel may advantageously be motor-driven in order to assist the movement means 9 to move the transport element 8.

The belt is made of a flexible material, for example rubber, so as to bend in a horizontal plane along the feed path P at curved stretches of the feed path P. In other words, the belt is designed to bend in order to be coupled with the movement means 9, with the toothed wheels of the operating stations or with idler elements present along the feed path P.

It should be noted that the belt and related supporting elements made in this way forms a single row of components (rigid containers 2) moving continuously along the feed path P.

According to the invention (see also FIGS. 5 to 13), the closing station 13 for closing the upper aperture 4 of the rigid container 2 comprises a unit 500 for preparing and feeding single pieces of sealing sheet 7 correlated with the shape of the upper aperture 4 of the rigid container 2.

Also according to the invention, the closing station 13 comprises transfer means 17 by which individual pieces of sealing sheet 7 are withdrawn sequentially and continuously from the preparing and feeding unit 500 and by which the pieces of sealing sheet 7 are transported and delivered to a corresponding pickup element 18 of a sealing wheel 19.

Also according to the invention, the sealing wheel 19 is adapted to seal the piece of sealing sheet 7 to the rigid container 2 and is rotatable continuously about a first vertical axis Z19 along a rotational path.

In light of this, the sealing wheel 19 is equipped around its circumference with a plurality of pickup elements 18 provided with corresponding sealing units 20.

Also according to the invention, the sealing units 20 on the wheel 19 are configured to be placed, in phase coordination, on top of a corresponding rigid container 2 on the transport element 8 in such a way as to join the piece 7 to the rigid container 2 along a stretch of the path P of the transport element 8 comprising a stretch, labelled T19, of the rotational path of the wheel 19 in phase synchrony with the transport element 8 itself.

In a first embodiment, illustrated in FIGS. 5 to 7 and 13, the preparing and feeding unit comprises a cutting unit 15 by which single pieces of sealing sheet 7 are continuously cut and separated from a continuous web 16.

In light of this, the cutting unit 15 is configured to cut and separate single pieces of sealing sheet 7 correlated with the shape of the upper aperture 4 of the rigid container 2.

The structure of the closing station thus obtained allows the sealing sheets to be formed and applied to the rigid containers at high speed.

The use of a continuous web from which to obtain the sealing sheet through the agency of a horizontal axis cutting unit combined with a transport system and application wheels with vertical axes makes it possible to considerably reduce the dimensions of the machine.

The system of single pickup elements for each piece of sealing sheet, combined with the fact that the pickup elements follow a path above the rigid containers, allows attaining a high level of positioning accuracy and capsule sealing quality.

Preferably, the cutting unit 15 comprises (see FIG. 7) a cylindrical knife 21 and a cylindrical counterknife 22 rotating about respective horizontal axes X21, X22, parallel to each other and configured to form a sequence of pieces of sealing sheet 7 at a first operating speed V1 correlated with the speed V3 of the transfer means 17 and with the speed V2 of the sealing wheel 19.

Figure 7:
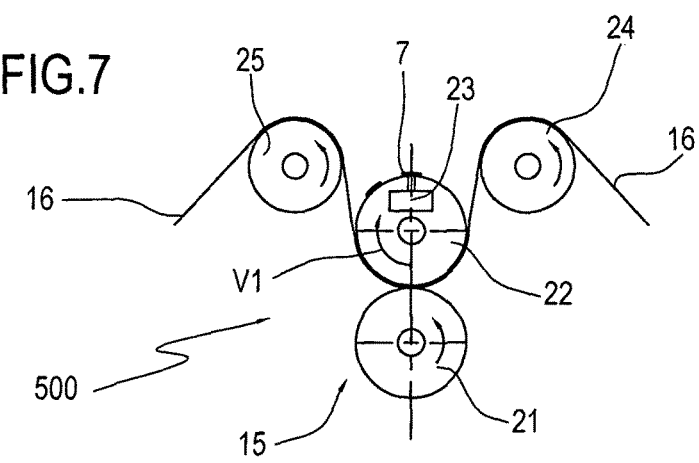
FIG. 7 is a schematic front view referred to FIG. 6 and illustrating the cutting unit for cutting pieces of sealing sheet from a continuous web.
Figure 8:
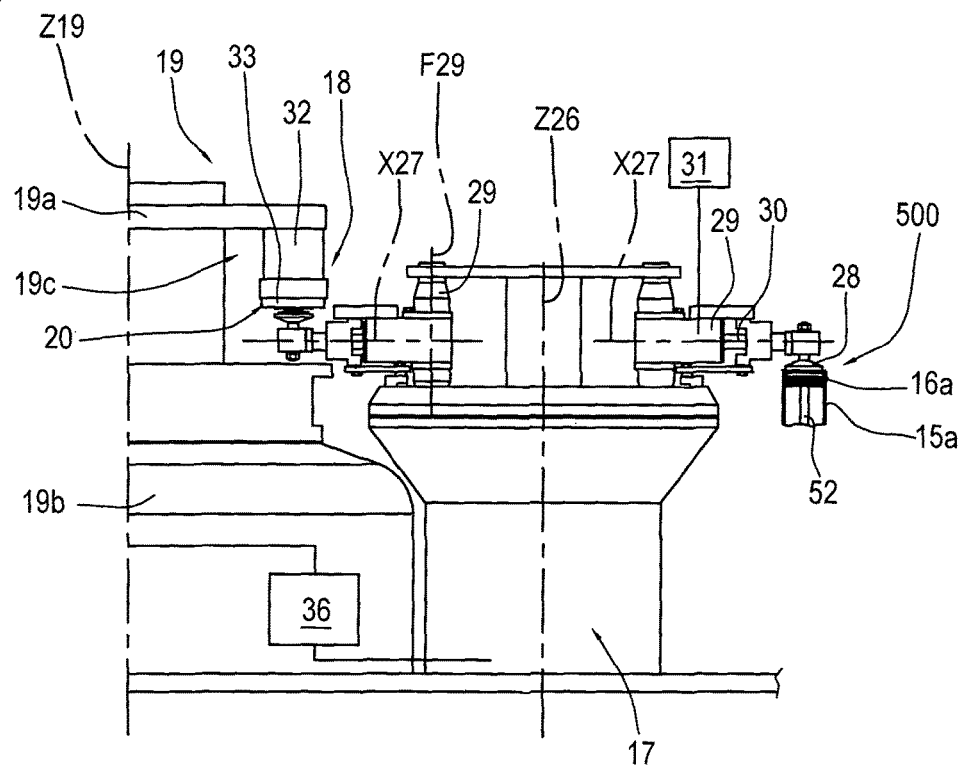
FIG. 8 is a schematic side view, with some parts cut away in order to better illustrate others, illustrating a part of the closing station in a second embodiment, comprising a magazine for pieces of sealing sheet.

More specifically, in the example of FIG. 7, the knife 21 rotates anticlockwise and the counterknife 22 clockwise.

Preferably, the counterknife 22 comprises suction means 23 (illustrated schematically in FIG. 7) located around the circumference of the counterknife 22 and acting in such a way as to hold the piece of sheet 7 until reaching an upper pickup zone where the piece of sealing sheet 7 is picked up by the transfer means 17.

In light of this, by way of a non-limiting example, the knife 21 forms circular pieces of sheet 7.

It should be noted that the knife 21 illustrated comprises a set of consecutive circular blades spaced according to a second spacing, while the counterknife 22 has a radial surface. The cutting unit 15 thus makes a plurality of pieces 7 spaced according to a second spacing.

Suction means 23 act on the radial surface of the counterknife 21 in such a way as to physically separate the piece of sheet 7 from the rest of the web 16, the piece 7 being formed when the knife 21 and the counterknife 22 come into tangential contact with each other.

It should be noted that the step of separating the sheet 7 from the continuous web 16 is also assisted by the upward movement of the circular path of the counterknife 22.

Preferably, as illustrated in FIG. 7, on opposite sides of the knife 21 and counterknife 22, there are idler rollers 24, 25 (at least one, preferably two) for deflecting the continuous web 16 to make the continuous web 16 follow a non-rectilinear path so that a portion of the continuous web 16 is always wound around an arcuate stretch of the cylindrical counterknife 22 for a corresponding contact time, causing the piece of sealing sheet 7 to adhere more easily to the counterknife 22 itself. In other words, the non-rectilinear path of the continuous web increases the contact time between the counterknife 22 and the continuous web 16, and hence the piece of sealing sheet 7.

Thanks to this architecture, the continuous web is wound partly around the counterknife both before and after the piece 7 is cut (that is, before and after the zone of tangency between the knife below and the counterknife above).

This arrangement of the web 16 facilitates adhesion of the piece of sheet 7 cut and separated from the rest of the web by the blades of the knife 21 and then held onto the counterknife 22 by the system of suctions means 23. This type of path, therefore, guarantees that the piece of sheet 7 adheres perfectly and precisely even at high speeds of rotation of the knife 21 and of the counterknife 22.

Preferably, the transfer means 17 comprise a carousel 26 which rotates about a second vertical axis Z26. The carousel 26 is equipped with a plurality of arms 27 protruding radially from the carousel 26 itself.

In light of this, each arm 27 has, at a free end of it, a suction head 28 for picking up the piece of sealing sheet 7 from the cutting unit 15 along a first horizontal plane, and delivering the piece of sealing sheet 7 to a corresponding pickup element 18 along a second horizontal plane. The first horizontal plane and the second horizontal plane may be only parallel to each other or they may coincide.

Preferably, each suction head 28 is connected to the corresponding arm 27 in such a way as to rotate about an axis X27 of longitudinal extension of the arm 27 (horizontal axis) in order:

to pick up the piece of sealing sheet 7 at a predetermined point of tangency between the suction head 28 itself and the cylindrical counterknife 22, the suction head 28 being above the cylindrical counterknife 22 and the piece of sealing sheet 7, and to deliver the piece of sealing sheet 7 to the corresponding pickup element 18 after a rotation of the suction head 28 through an angle α (corresponding to approximately 180°) about the axis X27 of longitudinal extension, the suction head 28 being under the corresponding pickup element 18.

In light of this, each suction head 28 is provided with corresponding suction means for retaining the piece of sealing sheet 7 (the suction means are not illustrated).

It should be noted that from the point where the sheet 7 is picked up to the point where the sheet 7 is delivered, the carousel 26 rotates about the second vertical axis Z26 through an angle β to carry the suction head 28 in the proximity of the sealing wheel 19. In the embodiment illustrated in the drawings, the angle β is approximately 180° but it is understood that other values of the angle β are possible.

Rotation of the carousel 26 though another angle takes each suction head 28 back towards the counterknife 22.

During the return rotation, the suction head 28 again rotates through an angle α to return to the position where it can pick up another piece of sealing sheet 7.

Preferably, each arm 27 of the carousel 26 has a rear support 29 connected to the carousel 26 and defining a vertical axis of rotation F29 about which a rod 30 joined to the suction head 28 rotates.

In light of this, the carousel 26 comprises means 31, for example cam means (illustrated schematically as a block), for varying the angular position of each arm 27 relative to the preceding or following arm 27 on the carousel 26 as a function of the position of the arm 27 relative to the cutting unit 15 or to the sealing wheel 19.

This angular variation of the arms 27 makes it possible to modify the spacing of the arms 27 during the steps of picking up and delivering the sheet 7: this feature allows coordinating the rotation speed of the carousel 26 because, for example, the distance (second spacing) between two consecutive pieces of sealing sheet 7 formed on the counterknife 22 is different from (smaller than) the distance between two pickup elements 18 rotating on the sealing wheel 19, which must be equal to the distance (first spacing) between adjacent pockets 10 on the transport element 8 during the delivery step. In other words, it is possible to minimize the second spacing in order to minimize waste and, at the same, to minimize the first spacing in order to maximize machine productivity, without the first spacing and the second spacing being necessarily the same.

In light of this, the machine 100 comprises a control unit 36 (illustrated as a block) connected at least to the cutting unit 15 and to the sealing wheel 19 to drive the cutting unit 15 and the sealing wheel 19 at a first operating speed V1 and at a second operating speed V2 which are different from each other.

The control unit 36 also controls the rotation speed V3 of the transfer carousel 26 for correct phase coordination between pickup and delivery of the sheet 7.

Preferably, on each arm 27, the rod 30 joins the suction head 28 and the rear support 29 of the arm 27 connected to the carousel 26.

In light of this, the joining rod 30 is configured to move in both directions along the longitudinal axis of extension X27 of the arm 27 in order to vary, that is, adapt, the position of the suction head 28 relative to the cutting unit 15 or to the sealing wheel 19 (see FIG. 5), and have more time for pickup and delivery.

This further movement of the arm 27 along the axis X27 means that some stretches of the paths followed by the suction head 28, the counterknife 22 and the pickup elements 18 coincide, thereby allowing the dimensions, that is, the distance between the cutting unit 15 and the sealing wheel 19, to be reduced.

The operating configuration of each arm 27 thus obtained may determine a different or alternative step of picking up the sealing sheet 7 from the knife 21.

In effect, each suction head 28 may alternatively be configured to pick up the piece of sealing sheet 7 by "following" the piece of sheet 7 along the radial surface of the counterknife 22.

In other words, the arm 27 can rotate about its longitudinal axis X27 as the suction head 28 passes above the counterknife 22 to pick up the sealing sheet 7 from the counterknife 22 even before (or only immediately after) the point of contact between the suction head 28 and the counterknife 22.

Thus, the step of picking up the piece of sheet 7 may be performed at higher speeds and more efficiently, thereby increasing productivity per unit time.

Preferably (see FIGS. 6, 8 and 13), the sealing wheel 19 comprises an upper part 19a and a lower part 19b.

In light of this, the upper part 19a and the lower part 19b face each other and rotate about the first vertical axis Z19 in such a way as to define between them a free space 19c allowing access to the suction head 28 and to the transport element 8 by which the rigid containers 2 are transported along corresponding stretches of circular path that do not interfere with each other.

In light of this, the sealing wheel 19 is interposed between further idler wheels 40 and 41 of the path of the transport element 8 in order to determine a common path between the transport element 8 and the sealing wheel 19 in a stretch of path opposite to the zone where the pieces of sheet 7 are delivered by the transfer means 17.

In light of this, the upper part 19a has a plurality of pickup elements 18 equally spaced along an underside surface of it and facing the lower part 19b.

Preferably, each pickup element 18 for gripping the sealing sheet 7 is located inside a corresponding sealing element 32 equipped with a sealing head 33.

Figure 13:
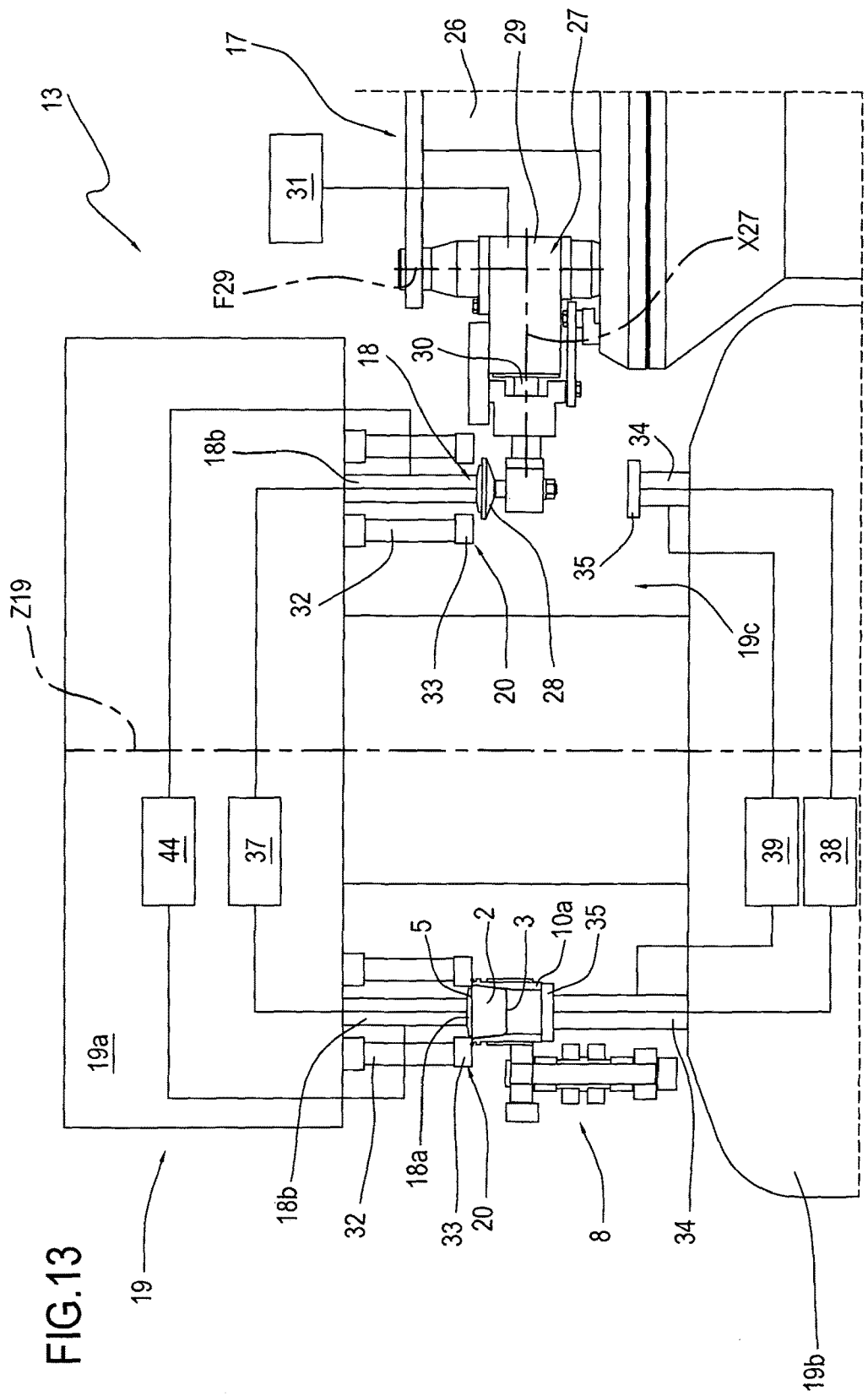
FIG. 13 is a schematic side view, with some parts cut away in order to better illustrate others, illustrating a sealing wheel and a part of the transfer means forming part of the closing station of FIGS. 5 to 12.

In light of this, the upper part 19a comprises movement means 44 for moving the pickup element 18 in between:

a first operating position for gripping the piece 7, lower than the suction head 28, where the pickup element 18 protrudes downwardly from the sealing element 32 (FIG. 6 and FIG. 13 right-hand side), and a second, raised operating position for joining the piece 7 to a rim 5 of the rigid container 2, where the pickup element 18 is inside the sealing element 32 and coplanar with the sealing head 33 (see FIG. 13 left-hand side).

In FIG. 13, the movement means 44 are illustrated as a block.

Preferably, the pickup element 18 comprises an end suction cup 18a connected to a vertical shaft 18b connected to the movement means 44 to define the two operating positions.

In light of this, the suction cup 18a is also connected to suction means 37 to retain the piece of sealing sheet 7 (the suction means being illustrated as a block in FIG. 13).

Preferably, the lower carousel 19b comprises a plurality of vertical rods 34 positioned to face corresponding pickup elements 18.

It should be noted that each rod 34 has an end plate 35 for supporting at a height the bottom 3 of a corresponding rigid container 2 at least at the stretch T19 of the path followed by the rigid container 2 housed inside the transport element 8 in contact with the corresponding sealing head 33.

In light of this, as mentioned above, the stretch T19 is the common stretch of path followed by the rigid container 2 and by the sealing wheel 19 where the edge or rim 5 of the rigid container 2 and the sealing sheet 7 come into contact with and are sealed to each other.

It should be noted that the end plate 35 may comprise further suction means 38 (illustrated as a block in FIG. 13) to stabilize the lifting and lowering movement of the rigid container 2 along the sealing stretch T19, keeping the container coaxial with the corresponding pocket 10 it is housed in.

Movement means 39 (illustrated as a block in FIG. 13) move the rod 34 supporting the plate 35 up and down.

It should also be noted that the plate 35 lifts the rigid container 2 relative to the pocket 10 of the transport element 8 until the piece 7 comes into contact with the sealing head 33, while the suction cup 18a of the pickup element 18 holds the sheet 7 in the correct position until the end of the sealing stretch T19.

In other words, as it moves along the sealing stretch T19, the piece 7 is sealed to the edge 5 of the rigid container 2 which is held in the raised position by the plate 35.

That way, the piece of sheet 7 is constantly controlled in position from the zone where it is formed to that where it is attached to the rigid container 2.

Alternatively, as illustrated in FIG. 13, the transport element 8 comprises a pocket 10 which is divided into a first, fixed portion and a second cup-shaped portion 10a movable axially along the axis Z10 and adapted to contain the rigid container 2.

In this embodiment, the plate 35 comes into contact with a rigid bottom of the movable portion 10a and causes it to be lifted (together with the rigid container 2 inside it) until coming into contact with the piece 7 and the sealing heads 33.

At the end of the sealing stretch T19, the plate 35 moves down and, at the same time, the second movable portion 10a returns to a lowered position with the capsule 1 closed.

The solution illustrated in FIG. 13 allows applying high sealing forces because the plate 35 acts directly on the second portion 10a and not on the rigid container 2 and because the second portion 10a acts in opposition to the sealing heads 33 along the sealing stretch T19.

In a further alternative embodiment, the rigid container 2 remains inside the corresponding pocket of the transport element 8 and the sealing head 33 and suction cup 18a of the pickup element 18 are moved towards it. In this alternative embodiment, the sealing wheel 19 comprises further movement means to move the sealing head 33 and the suction cup 18a of the pickup element 18 towards and away from the rigid container 2.

FIGS. 8 to 12 illustrate a variant embodiment of the unit for preparing and feeding single pieces of sealing sheet 7 (or lids).

This alternative embodiment is fully integrated in the structure of the station described to here.

In effect, the transfer means 17 and the sealing wheel 19 have the same structure and operation as that described to here.

The unit for preparing and feeding the pieces of sheet or lids 7 comprises a magazine 15a for slidably housing a stack 16a of lids 7 (ready made and correlated with the shape of the upper aperture 4 of the rigid container 2).

In the embodiment illustrated in the drawings, the magazine 15a extends vertically. In alternative embodiments not illustrated, the magazine 15a is inclined at an angle to the vertical.

More in detail, the magazine 15a has an opening 50 from which lids 7 can be withdrawn one at a time and at which there are retaining means 51, for example an annular tooth, designed to hold back the stack 16a of lids 7.

The magazine 15a also comprises a pushing element 52, for example a piston, for pushing the stack 16a into contact with the retaining means 51 and to feed a corresponding lid 7 to the transfer means 17, as described in detail below. The magazine 15a is of a size such as to be able to slidably house the stack 16a of lids 7.

In the embodiment illustrated, the magazine 15a is positioned with the opening 50 facing upwards and the pushing element 52 located under the stack 16a to push the lids 7 upwards. In short, the magazine 15 is positioned under the transfer means 17.

Alternatively, in a preferred embodiment of the invention, not illustrated, the magazine 15a may be positioned above the transfer means 17, with the opening 50 facing downwards and the pushing element 52 pushing the stack 16a of lids 7 down from above.

Preferably, as described above, each suction head 28 is connected to the corresponding arm 27 in such a way as to rotate about an axis X27 of longitudinal extension of the arm 27 (horizontal axis) in order:
  to withdraw the lid 7 at a pickup point, that is, at a point of tangency between the suction head 28 itself and the magazine 15a (in particular at the opening 50), the suction head 28 being above the magazine 15a and the lid 7 (in the embodiment illustrated in FIGS. 8 to 12), and
  to deliver the lid 7 to the corresponding pickup element 18 at the corresponding delivery point after a rotation of the suction head 28 through an angle α (corresponding to approximately 180°) about the axis X27 of longitudinal extension, the suction head 28 being under the corresponding pickup element 18.

In light of this, each suction head 28 is suitably shaped to have a curved contact surface 53 equipped with corresponding suction means for withdrawing the lid 7 from the magazine 15a and holding it (the suction means not being illustrated).

Figures 9, 10, 11:
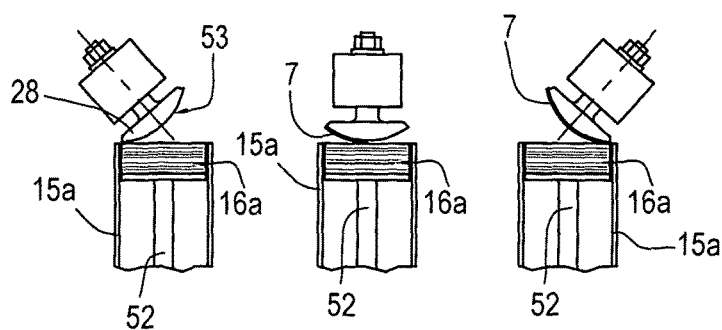
FIGS. 9, 10 and 11 illustrate corresponding steps of picking up a piece of sealing sheet by means of pickup means in the second embodiment of FIG. 8 and in a schematic front view referred to FIG. 8.

FIGS. 9, 10 and 11 illustrate a sequence of steps of picking up a first lid 7 from the stack 16a by means of a suction head 28 of an arm 27 according to a first preferred embodiment.

More specifically, as the suction head 28 picks up the lid 7, the arm 27 rotates about the axis X27 so as to make the suction head 28 also rotate. In a first step of approach and contact (FIG. 9), the suction head 28 comes into contact with the lid 7 at a first peripheral zone of the selfsame lid 7. Next, in a step of preliminary detachment (FIG. 10), using the flexibility of the lid 7 to overcome the action of the retaining means 51, the suction head 28 detaches the first peripheral zone of the lid 7 from the stack 16a and from the magazine 15a, thanks to the suction means and to a first rotation about the axis X27. Lastly, in a step of final detachment (FIG. 11), the suction head 28 completely detaches the lid 7 from the stack 16a and from the magazine 15a thanks to a further rotation about the axis X27.

During pickup, therefore, the suction head 28 performs a rotation (clockwise in the drawings) so that its entire contact surface 53 comes into contact with the lid 7 to be withdrawn. Also, thanks to this rotation, the suction head 28 starts withdrawing the lid 7 from the magazine 15a even before the point of tangency between the suction head 28 and the magazine 15a.

In short, thanks to the rotation about the axis X27 during pickup, the contact surface 53 of the suction head 28 comes into contact with the first lid 7 in the stack 16a without scraping against it. Also, the suction means are on so as to detach and hold back the lid 7 from the stack 16a. Thus, the lid 7 can be picked up at a relatively high speed, thereby increasing productivity per unit time.

Figure 12:
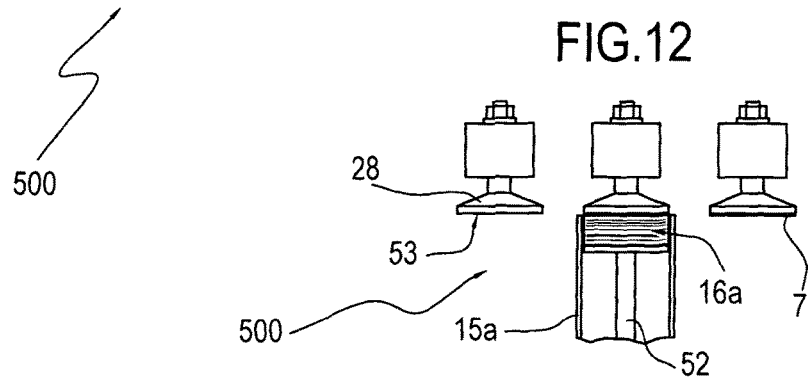
FIG. 12, illustrates a variant embodiment of the steps of picking up a piece of sealing sheet by means of pickup means in the second embodiment of FIG. 8 and in a schematic front view referred to FIG. 8.

Alternatively, in a second alternative embodiment illustrated in FIG. 12, the suction head 28 may have a flat contact surface 53 and not rotate during pickup. In this embodiment, during the entire pickup operation, the suction head 28 is positioned with its contact surface 53 parallel to the lid 7 to be withdrawn. In practice, pickup of the lid 7 from the stack 16a is almost instantaneous. This second alternative embodiment may be advantageously applied in machines that work at relatively low operating speeds.

A closing station structured in this way offers numerous advantages:
  the sealing sheets are formed and applied to the rigid containers at a high speed thanks to the sequence of steps performed by units which move continuously;
  the overall dimensions of the machine are reduced thanks to a cutting unit which rotates about a horizontal axis combined with a system of transporting and applying the sealing sheet comprising wheels that rotate about vertical axes;
  the amount of waste material during the formation of the sealing sheets is reduced thanks to the use of a continuous web and the reduced distance (spacing) between two successive sealing sheets formed;
  the sealing sheet is positioned and sealed with a high level of accuracy thanks to the system of single pickup elements for each sealing sheet, combined with the fact that the pickup elements follow a path above the transport element; this factor translates as good capsule sealing quality and effectiveness.

The invention claimed is:

1. A beverage capsule machine for making single use capsules (1) for extract or infusion beverages, each capsule comprising a rigid, cup-shaped container (2) having a bottom (3) and an upper aperture (4) provided with a rim (5), a dose (6) of extract or infusion product contained inside the rigid container (2) and a piece of sealing sheet (7) for closing the upper aperture (4) of the rigid container (2), the machine comprising: a transport element (8) for transporting the rigid containers (2) along a feed path (P) closed in a loop; the transport element (8) being configured to define a plurality of pockets (10) for receiving the rigid containers (2) and which are positioned one after the other, in sequence, each having a respective vertical axis (Z10); a plurality of stations which are positioned along the feed path (P) followed by the transport element (8) and which are configured for operating in phase with the same transport element (8) and comprising: a feeding station (11) for feeding the rigid containers (2) into respective pockets (10) of the transport element (8); a dosing station (12) for filling a dose (6) of product into the rigid container (2); a closing station (13) for closing the upper aperture (4) of the rigid container (2) with the piece of sealing sheet (7); and an outfeed station (14) which withdraws the formed capsules (1) from the transport element (8);

wherein the closing station (13) comprises at least:
a unit (500) for preparing and feeding single pieces of sealing sheet (7) correlated with the shape of the upper aperture (4) of the rigid container (2);
a sealing wheel (19) for sealing the piece of sealing sheet (7) to the rigid container (2), said sealing wheel being rotatable continuously about a first vertical axis (Z19) along a rotational path and being provided with a plurality of pickup elements (18) and a plurality of sealing units (20) around its circumference;
transfer means (17) by which individual pieces of sealing sheet (7) are withdrawn sequentially and continuously from the preparing and feeding unit (500) and by which the pieces of sealing sheet (7) are transported and delivered to the corresponding pickup element (18) of the sealing wheel;
the pickup elements (18) and the sealing units (20) on the sealing wheel (19) being configured to be placed simultaneously, in phase coordination, in proximity to the rigid container (2) on the transport element (8) in such a way as to join and seal the piece of sealing sheet (7) to the rigid container (2) along a stretch of the feed path (P) of the transport element (8) comprising a stretch (T19), of the rotational path of the sealing wheel (19) in phase synchrony with the transport element (8) itself, and wherein the transfer means (17) comprise a carousel (26) which rotates about a second vertical axis (Z26) and which is equipped with a plurality of arms (27) protruding radially from the carousel (26) itself; each arm (27) having, at a free end of it, a suction head (28) for picking up the piece of sealing sheet (7) from the preparing and feeding unit (500) along a first horizontal plane, and delivering the piece of sealing sheet (7) to a corresponding pickup element (18) along a second horizontal plane.

2. The machine according to claim 1, wherein each arm (27) of the carousel (26) has a rear support (29) connected to the carousel (26) and defining a vertical axis of rotation (F29) about which a rod (30) joined to the suction head (28) rotates; the carousel (26) comprising means (31) for varying an angular position of each arm (27) relative to a preceding or following arm (27) on the carousel (26) and as a function of the position of the arm (27) relative to the preparing and feeding unit (500) and to the sealing wheel (19).

3. The machine according to claim 2, wherein each arm (27) comprises the rod (30) by which the suction head (28) is joined to the rear support (29) of the arm (27); the joining rod (30) being configured to move in both directions along a longitudinal axis of extension (X27) of the arm (27) in order to vary the position of the suction head (28) relative to the preparing and feeding unit (500) and to the sealing wheel (19).

4. The machine according to claim 1, wherein each suction head (28) is connected to the corresponding arm (27) in such a way as to rotate about an axis (X27) of longitudinal extension of the arm (27) to pick up from above the piece of sealing sheet (7) at a predetermined point of tangency between the suction head (28) itself and a cylindrical counter knife (22) and to deliver from the bottom up the piece of sealing sheet (7) to the corresponding pickup element (18) after a rotation of the suction head (28) through an angle (α) about the axis (X27) of longitudinal extension.

5. The machine according to claim 1, wherein the sealing wheel (19) comprises an upper part (19a) and a lower part (19b) facing each other and rotating about the first vertical axis (Z19); the upper part (19a) and the lower part (19b) defining between them a free space (19c) allowing access to the suction heads (28) and to the transport element (8) along corresponding stretches of circular path that do not interfere with each other.

6. The machine according to claim 5, wherein each pickup element (18) of the sealing wheel (19) is positioned inside a corresponding sealing element (32) equipped with a sealing head (33); the upper part (19a) comprising movement means (34) for moving the pickup element (18) between a first, lowered operating position where the piece (7) of sealing sheet is picked up by the suction head (28) and the pickup element (18) protrudes from the sealing element (32), and a second, raised operating position where the piece (7) of sealing sheet is attached to the rim (5) of the rigid container (2) and the pickup element (18) is inside the sealing element (32) and coplanar with the sealing head (33).

7. The machine according to claim 5, wherein the lower part (19b) comprises a plurality of vertical rods (34) positioned to face corresponding pickup elements (18); each rod (34) having an end plate (35) for supporting at a height, the bottom (3) of the rigid container (2) for at least the stretch (T19) of the path followed by the rigid container (2) to come into contact with a corresponding sealing head (33).

8. The machine according to claim 1, wherein the plurality of pickup elements (18) on the sealing wheel (19) are equally spaced along an underside surface of an upper part (19a) and facing a lower part (19b).

9. The machine according to claim 1, wherein each of the pockets (10) of the transport element (8) is divided into a first, fixed portion and a second portion (10a) movable axially along the axis (Z10) of extension of the pocket (10) and adapted to contain the rigid container (2), a lower part (19b) of the sealing wheel (19) comprising a plurality of vertical rods (34) positioned to face corresponding pickup elements (18); each rod (34) having an end plate (35) for supporting at a height a corresponding second portion (10a) of the pocket (10) of the transport element (8) for at least the stretch (T19) of the path followed by the rigid container (2) to come into contact with a corresponding sealing head (33).

10. The machine according to claim 1, comprising a control unit (36) for controlling in phase the transfer means (17) and the sealing wheel (19).

11. The machine according to claim 1, wherein the preparing and feeding unit comprises a cutting unit (15) by which single pieces of sealing sheet (7) are continuously cut and separated from a continuous web (16); the cutting unit (15) being configured to cut and separate single pieces of sealing sheet (7) correlated with the shape of the upper aperture (4) of the rigid container (2).

12. The machine according to claim 11, wherein the cutting unit (15) comprises a cylindrical knife (21) and a cylindrical counter knife (22) rotating about respective horizontal axes (X21, X22), parallel to each other and configured to form a sequence of pieces of sealing sheet (7) at a first operating speed (V1); the counter knife (22) comprising suction means (23) located circumferentially on a radial surface and acting in such a way as to hold the piece of sealing sheet (7) until reaching an upper pickup zone where the piece of sealing sheet (7) is picked up by the transfer means (17).

13. The machine according to claim 12, wherein on opposite sides of the knife (21) and counter knife (22), there are idler rollers (24, 25) for deflecting the continuous web (16) to make the continuous web (16) follow a non-rectilinear path so that a portion of the continuous web (16) is always wound around an arcuate stretch of the cylindrical counter knife (22) causing the piece of sealing sheet (7) to adhere to the counter knife (22) itself.

14. The machine according to claim 11, comprising a control unit (36) connected to the cutting unit (15) and to the sealing wheel (19) to drive the cutting unit (15) and the sealing wheel (19) at, respectively, a first operating speed (V1) and a second operating speed (V2) which are different from each other.

15. The machine according to claim 11, wherein the pockets (10) are located along the transport element (8) according to a first spacing and the cutting unit (15) cuts and separates single pieces of sealing sheet (7) continuously according to a second spacing.

16. The machine according to claim 1, wherein the preparing and feeding unit comprises a magazine (15a) for slidably containing a stack (16a) of single pieces of sealing sheet (7), the transfer means (17) being adapted to withdraw individual pieces of sealing sheet (7) sequentially and continuously from the magazine (15) and to transport and deliver the pieces of sealing sheet (7) to the corresponding pickup element (18).

17. A beverage capsule machine for making single use capsules (1) for extract or infusion beverages, each capsule comprising a rigid, cup-shaped container (2) having a bottom (3) and an upper aperture (4) provided with a rim (5), a dose (6) of extract or infusion product contained inside the rigid container (2) and a piece of sealing sheet (7) for closing the upper aperture (4) of the rigid container (2), the machine comprising: a transport element (8) for transporting the rigid containers (2) along a feed path (P) closed in a loop; the transport element (8) being configured to define a plurality of pockets (10) for receiving the rigid containers (2) and which are positioned one after the other, in sequence, each having a respective vertical axis (Z10); a plurality of stations which are positioned along the feed path (P) followed by the transport element (8) and which are configured for operating in phase with the same transport element (8) and comprising: a feeding station (11) for feeding the rigid containers (2) into respective pockets (10) of the transport element (8); a dosing station (12) for filling a dose (6) of product into the rigid container (2); a closing station (13) for closing the upper aperture (4) of the rigid container (2) with the piece of sealing sheet (7); and an outfeed station (14) which withdraws the formed capsules (1) from the transport element (8);

wherein the closing station (13) comprises at least:
   a unit (500) for preparing and feeding single pieces of sealing sheet (7) correlated with the shape of the upper aperture (4) of the rigid container (2);
   a sealing wheel (19) for sealing the piece of sealing sheet (7) to the rigid container (2), said sealing wheel being rotatable continuously about a first vertical axis (Z19) along a rotational path and being provided with a plurality of pickup elements (18) and a plurality of sealing units (20) around its circumference;
   transfer means (17) by which individual pieces of sealing sheet (7) are withdrawn sequentially and continuously from the preparing and feeding unit (500) and by which the pieces of sealing sheet (7) are transported and delivered to the corresponding pickup element (18) of the sealing wheel;
the pickup elements (18) and the sealing units (20) on the sealing wheel (19) being configured to be placed simultaneously, in phase coordination, in proximity to the rigid container (2) on the transport element (8) in such a way as to join and seal the piece of sealing sheet (7) to the rigid container (2) along a stretch of the feed path (P) of the transport element (8) comprising a stretch (T19), of the rotational path of the sealing wheel (19) in phase synchrony with the transport element (8) itself; and wherein
the preparing and feeding unit comprises a cutting unit (15) by which single pieces of sealing sheet (7) are continuously cut and separated from a continuous web (16); the cutting unit (15) being configured to cut and separate single pieces of sealing sheet (7) correlated with the shape of the upper aperture (4) of the rigid container (2); and wherein
the cutting unit (15) comprises a cylindrical knife (21) and a cylindrical counter knife (22) rotating about respective horizontal axes (X21, X22), parallel to each other and configured to form a sequence of pieces of sealing sheet (7) at a first operating speed (V1); the counter knife (22) comprising suction means (23) located circumferentially on a radial surface and acting in such a way as to hold the piece of sealing sheet (7) until reaching an upper pickup zone where the piece of sealing sheet (7) is picked up by the transfer means (17).

\* \* \* \* \*